(12) United States Patent
Lessmeister

(10) Patent No.: US 8,801,089 B2
(45) Date of Patent: Aug. 12, 2014

(54) MOTOR VEHICLE BODY

(75) Inventor: Roland Lessmeister, Otterberg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/543,956

(22) Filed: Jul. 9, 2012

(65) Prior Publication Data
US 2013/0009426 A1 Jan. 10, 2013

(30) Foreign Application Priority Data
Jul. 8, 2011 (DE) .......................... 10 2011 106 951

(51) Int. Cl.
*B62D 25/04* (2006.01)
*B62D 21/15* (2006.01)

(52) U.S. Cl.
USPC ........................................... 296/209; 296/198

(58) Field of Classification Search
USPC ............ 296/198, 193.09, 203.03, 209, 181.6, 296/187.06, 187.12
See application file for complete search history.

(56) References Cited

U.S. PATENT DOCUMENTS

| | | | |
|---|---|---|---|
| 4,545,612 A | 10/1985 | Harasaki | |
| 5,671,968 A * | 9/1997 | Masuda et al. | 296/187.12 |
| 6,286,867 B1 | 9/2001 | Braemig et al. | |
| 6,364,358 B1 * | 4/2002 | Miller | 280/784 |
| 8,113,572 B2 | 2/2012 | Mildner et al. | |
| 2010/0295336 A1 | 11/2010 | Itakura | |

FOREIGN PATENT DOCUMENTS

| | | |
|---|---|---|
| DE | 19956430 A1 | 5/2001 |
| DE | 10314972 A1 | 10/2004 |
| DE | 102004016137 A1 | 11/2005 |
| DE | 102006053015 A1 | 5/2008 |
| DE | 102007015394 A1 | 10/2008 |
| GB | 2484776 A | 4/2012 |
| JP | 4185584 A | 7/1992 |
| JP | 10226363 A | 8/1998 |
| JP | 2007283997 A | 11/2007 |

OTHER PUBLICATIONS

UK IPO, British Search Report for Application No. 1211550.7, dated Sep. 27, 2012.
German Patent Office, German Search Report for Application No. 102011106951.1, dated Apr. 24, 2012.

* cited by examiner

*Primary Examiner* — Glenn Dayoan
*Assistant Examiner* — Melissa A Black
(74) *Attorney, Agent, or Firm* — Ingrassia Fisher & Lorenz, P.C.

(57) ABSTRACT

A motor vehicle body is provided. The motor vehicle body includes a sill extending under a door opening and a fender fastened to the sill. A sill bulkhead seals off an inner hollow space of the sill at a face end and a first fastening point on the sill bulkhead fastens the fender to the sill.

12 Claims, 4 Drawing Sheets

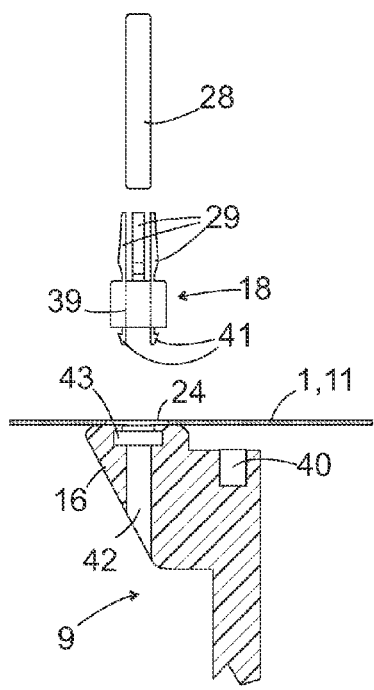
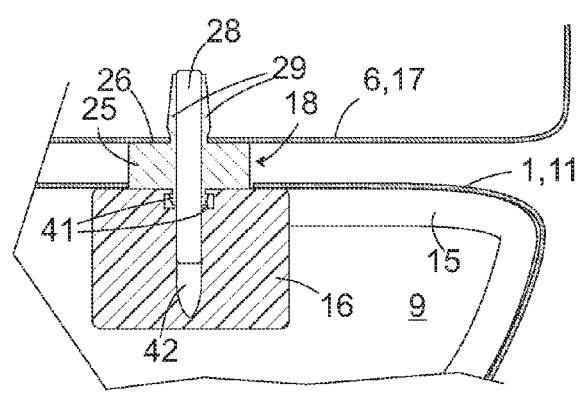

MOTOR VEHICLE BODY

CROSS-REFERENCE TO RELATED APPLICATION

This application claims priority to German Patent Application No. 10 2011 106 951.1, filed Jul. 8, 2011, which is incorporated herein by reference in its entirety.

TECHNICAL FIELD

The technical field relates to a motor vehicle body, namely to the motor vehicle bodywork specifically in the region of the ends of a sill extending under a door opening of the body.

BACKGROUND

A motor vehicle bodywork specifically in the region of the ends of a sill extending under a door opening of the body is conventionally closed off at the face end by a sill bulkhead at an end facing the front or rear wheel housing of the body. This is to form a hollow space in the interior of the sill that protects against the entry of rainwater or splash water from the wheel housing. A motor vehicle body having such a sill bulkhead is known for example from DE 10 2007 015 394 A1 and DE 2008 049 758 A1.

At its ends, the sill is conventionally connected to a fender of the body extending above it. A connection of sill and fender by means of screws requires as a prerequisite the presence of openings on the sill, through which the screws can extend; so as not to impair the tightness of the hollow space, these screws are arranged beyond the sill bulkhead. In order to ensure that fender and sill are not twisted relative to one another because of internal stresses and in order to ensure a uniform joint appearance between the two, at least two screws are used for the attachment of which is time consuming.

At least one object herein therefore is to create a body structure which makes possible a quick and economical assembly. In addition, other objects, desirable features and characteristics will become apparent from the subsequent summary and detailed description, and the appended claims, taken in conjunction with the accompanying drawings and this background.

SUMMARY

In an exemplary embodiment, a motor vehicle body having a sill extending below a door opening is provided. A fender is fastened to the sill and a sill bulkhead closes off an inner hollow space of the sill at the face end. A first fastening point for the fastening of the fender to the sill bulkhead is formed.

For fastening together, the sill and the fender practically comprise surface regions located opposite each other. The first fastening point can then practically comprise a protrusion engaging through an opening of the surface region of the sill into an opening of the surface region of the fender. It is therefore sufficient for an at least provisional assembly of the fender, to place the latter onto the protrusion of the sill bulkhead.

If the openings are provided in a top side of the sill and a fastening flange is angled off a lower edge of the fender, the fender is at least provisionally held on the protrusion through its own weight.

In an embodiment, the cross sections of the protrusion and the opening of the fender are matched to each other so that the fender is fixed on the sill through the engagement of the protrusion in at least one direction that is parallel to the mentioned surface regions.

The protrusion can be formed unitarily with the sill bulkhead; in order to assemble the sill bulkhead, it can be introduced into the sill via an open inner side, the protrusion introduced into the opening of the sill and then the sill bulkhead pivoted into an upright position about an axis that is substantially oriented in a vehicle transverse direction. However, it is also conceivable to design the sill bulkhead and protrusion in two parts and to attach the protrusion on the sill bulkhead through the opening of the sill only after the pivoting of the sill bulkhead into the upright position.

If the protrusion is connected to the flange via a preferentially shearable pin, the latter can prevent through shearing off the transmission of a deformation between fender and sill in the event of an accident, and by fixing a new protrusion with a new pin, the prerequisites for a renewed fastening of the repaired or replaced fender can be created in a simple and cost-effective manner.

In that the surface region of the fender rests on a step of the protrusion, the width of a joint between the sill and the fender can be adjusted in a simple exactly reproducible manner.

A tip of the protrusion protruding over the step, which engages in the opening of the fender, can guarantee fixing of the fender with respect to the sill at least in a direction that is parallel to the surface regions.

With the help of fingers of the tip that can spread apart, fixing of the fender is also possible in a direction that is perpendicular to the surface regions.

Fastening of sill and fender to each other at a second fastening point is desirable in order to ensure that the surface regions of sill and fender located opposite each other cannot rotate against each other about a common surface normal. This second fastening point can comprise in particular a screw connection.

In an embodiment, the sill bulkhead is not involved in this second fastening point.

In order to make possible fastening of the sill that is generally approximately U-shaped in cross section also to a bottom side of the sill bulkhead, the sill bulkhead at its bottom side can comprise a hook, which engages through an opening formed on a lower leg of the sill.

Seen in longitudinal direction of the sill, this opening is preferentially located on a side of the sill bulkhead facing away from the inner hollow space, so as not to impair the tightness of this hollow space.

Preferentially, the hook acts on an edge of the opening extending in vehicle transverse direction. Thus, the hook can already be brought into engagement at the edge of the opening even when the sill bulkhead within the sill is pivoted into its upright position.

BRIEF DESCRIPTION OF THE DRAWINGS

The various embodiments will hereinafter be described in conjunction with the following drawing figures, wherein like numerals denote like elements, and wherein:

FIG. 6 is an expanded sectional representation of the sill, of the sill bulkhead, of a protrusion to be mounted to the sill bulkhead and a pin anchoring the protrusion to the sill bulkhead according to another embodiment; and FIG. 7 is a section in a vehicle transverse direction through the parts shown in FIG. 5 and the fender fastened with their help.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
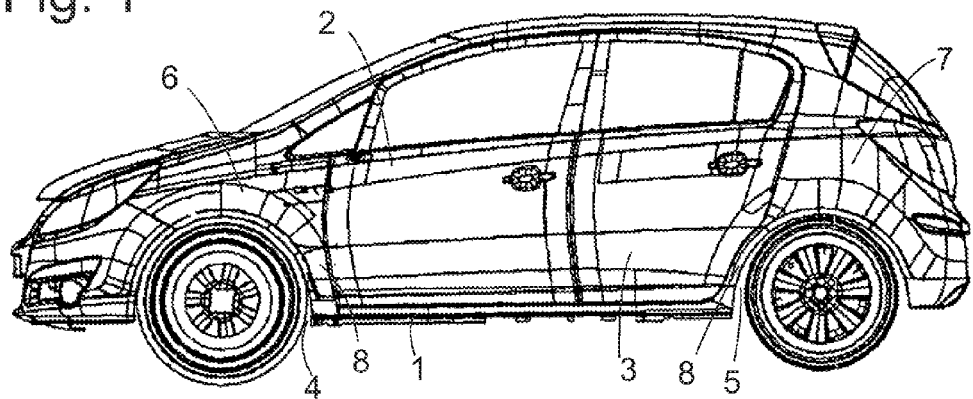
FIG. 1 is a motor vehicle body.

FIG. 1 shows in a lateral view a motor vehicle body. In a manner known per se, a sill 1 extends below doors 2, 3 between front and rear wheel housings 4, 5. About the wheel housings 4, 5 there extend front and rear fenders 6, 7, each of which have a narrow arm 8 fastened with its tip to an end section of the sill 1.

Figure 2:
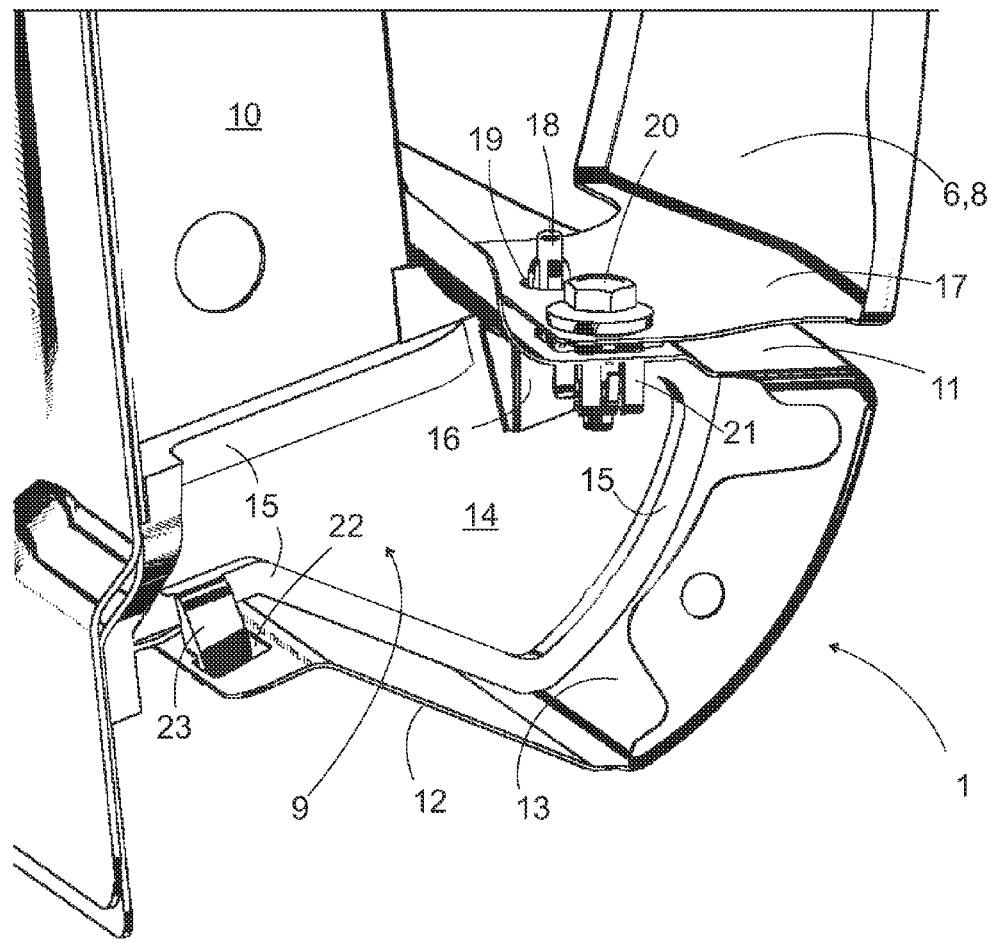
FIG. 2 is a perspective part view of components of a motor vehicle body according to an exemplary embodiment.

FIG. 2 shows the front end section of the sill 1 and the tip of the arm 8 of the front fender 6 fastened thereto and a sill bulkhead 9, which extends transversely through the inner hollow space of the sill 1. The sill 1 and the fender 6 are formed of metal sheet cuttings in the usual technical manner. The sill 1 has a U or Ω-like cross section that remains the same or at the most varies slightly in vehicle longitudinal direction with upper and lower legs 11, 12 which are approximately horizontal or, in the case shown here, slightly rise towards the vehicle interior and diverge at their free ends and a curved intermediate section 13 freely visible on the vehicle outside and connecting the legs 11, 12.

The injection-molded sill bulkhead 9 of plastic has a baseplate 14 that is substantially vertical and oriented in vehicle transverse direction, which is surrounded by a reinforced rim 15. The sill 1 closely hugs the rim 15 throughout its circumference and a foam material layer that is not visible in FIG. 2 seals any joints between the rim 15 and the sill 1 in a watertight manner so that a hollow space, which extends beyond sill bulkhead 9 over a large part of the length of the sill 1, is protected from the entry of water from the sides of the wheel housing 4. A further sill bulkhead of similar shape that is not shown in the Figures can be provided at the end of the sill 1 facing the rear wheel housing 5 in order to seal off the hollow space also to the back.

In an upper region of the baseplate 14, a flange supporting the leg 11 of the sill 1 is formed, here in the shape of a transom 16 protruding on the side of the baseplate 14 adjacent to the wheel housing 4. The transom 16 carries a protrusion 18 on its top side only partially visible in FIG. 2, which penetrates an opening (concealed in FIG. 2) in the upper leg 11 of the sill 1 and an opening 19 in a fastening flange 17 of the fender 6 angled-off substantially horizontally in an end of the arm 8 of the fender 6. In that the protrusion 18 contacts the edges of the opening 19 of the fastening flange 17 free of play on three or more points, it fixes the fastening flange 17 at least in directions that are parallel to its surface. In order to prevent a movement of the fastening flange 17 perpendicularly to its surface and a rotation about a rotary axis possibly defined through the engagement of the protrusion 18 in the opening 19, a screw 20 is screwed into a threaded clamp 21 anchored on a second opening of the leg 11 through a second opening of the fastening flange 17.

In the edge region of the lower leg 12 angled off towards the outside, an opening 22 is cut, through which a hook 23 that is unitary with the baseplate 14, extends.

Figure 3:
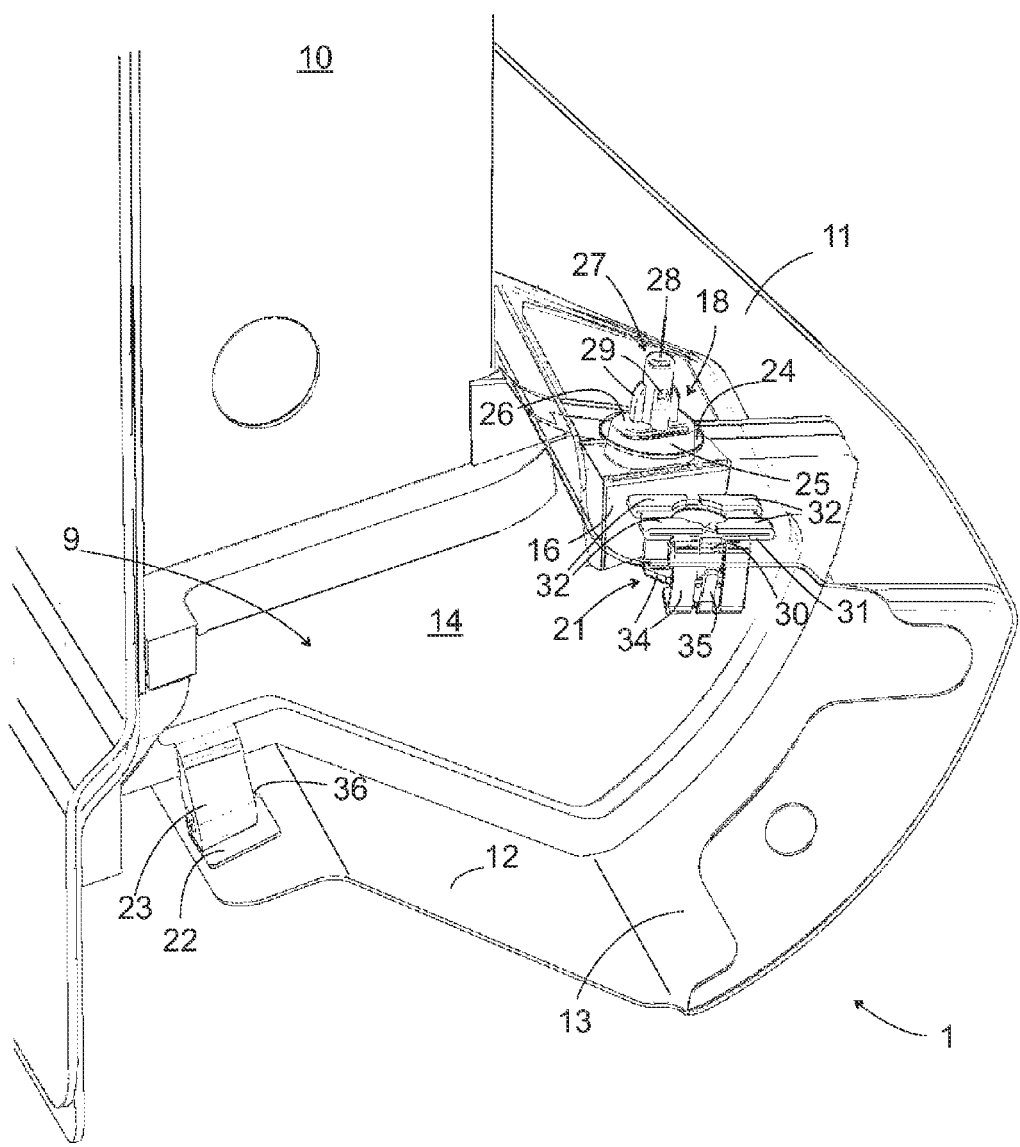
FIG. 3 is a second perspective view showing the sill and the sill bulkhead of the motor vehicle body, omitting the fender provided for fastening thereto.

FIG. 3 shows a view from a similar perspective as FIG. 2, wherein however the fender 6 has been omitted and the sill 1 is shown transparently in order to be able to more clearly show the sill bulkhead 9 and its protrusion 18 as well as the threaded clamp 21. The sill bulkhead 9 is elastically clamped between the legs 11, 12 of the sill 1, so that the upper leg 11 rests on the transom 16 round about the opening already mentioned above, designated 24 here. The protrusion 18 engages through the opening 24 with little play in vehicle transverse direction, so that the position of the sill 1 in vehicle transverse direction and in the vertical is substantially fixed via the anchorage of the sill bulkhead 9 on the side wall 10.

The protrusion 18 is divided into a compact block 25, whose base area in this case approximately has the shape of a rectangle with rounded-off corners, and whose flanks in contact with the edges of the opening 24 fix the position of the sill 1 and a tip 27 rising above a top side 26 of the block 25, the engagement of which in the opening 22 (not visible in FIG. 3) fixes the fender 6 relative to the sill 1.

The tip 27 in this case consists of a central pin 28 and a plurality of fingers 29 grouped round about the pin 28, the function of which will still be discussed later on.

The threaded clamp 21 comprises a rectangular baseplate 31 resting on the leg 11 via an opening 30 cut out therein, from the narrow sides of which four fingers 32 are folded back over the baseplate 31, in order to delimit a through-hole 33 for the screw 20 in each case to a part of its circumference. In that the fingers 32 are axially deflected by the thread of the screw 20, they form a thread turn that is complementary to the thread, which holds the screw 20. Legs 34 angled off the wide sides of the baseplate 31 extend through the opening 30 into the interior of the sill 1 and fix the tip of the screw 20 between its distal ends facing each other. Tongues 35 cut clear and spread apart from the legs 34 contact a bottom side of the leg 11 with their distal ends, thus securing the threaded clamp 21 to the sill 1.

Figure 4:
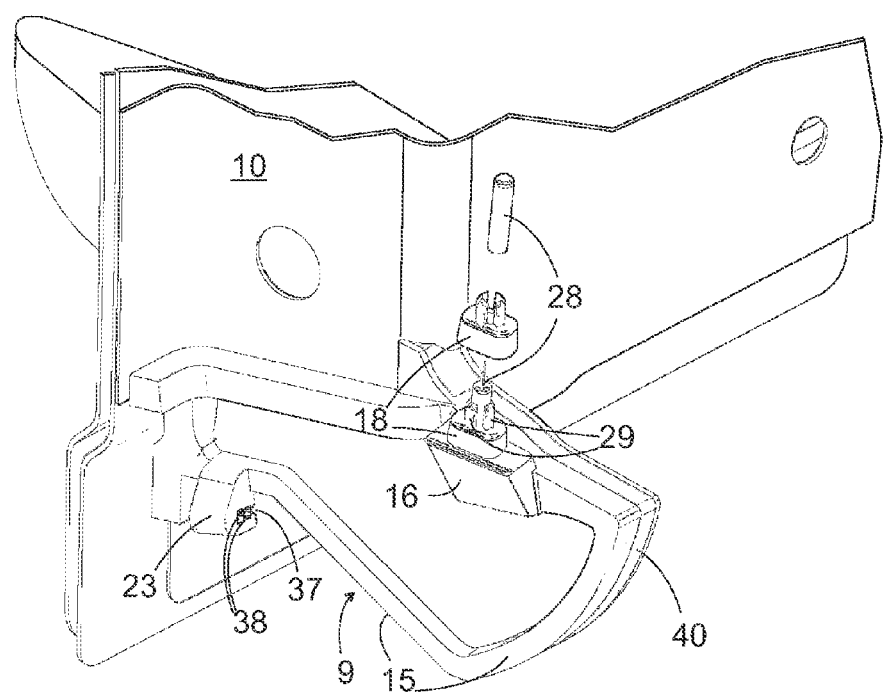
FIG. 4 is a perspective view of the sill bulkhead together with supporting parts of the body, without sill and fender.

FIG. 4 shows the sill bulkhead 9 and the sidewall 10 without sill 1 and fender 6. This representation does not correspond to any intermediate stage during the assembly of the body, since in fact the sill bulkhead 9 and the sidewall 10 are only indirectly connected to each other via the sill 1. The protrusion 18 and the pin 28 fixing it are visible once mounted on the transom 16 and once in expanded representation, separated from the latter. For as long as the protrusion 18 is not mounted onto the transom 16, it does not aggravate the attachment of the sill bulkhead 9 in the sill 1. This is performed in that the sill bulkhead with baseplate 14 substantially oriented horizontally is introduced into the sill 1 and then pivoted into vertical orientation about an axis that is substantially oriented in vehicle transverse direction. Through this pivot movement, the hook 23 of the sill bulkhead 9 plunges into the opening 22 in the lower leg 12 of the sill 1, and an edge section 36 (see FIG. 3) of the opening 22 extending in vehicle transverse direction engages into a recess 37 of the hook 23. Teeth 38 of the hook 23 protruding into the recess 37 are slightly deformed in the process, so that the leg 12 is held on the hook 23 free of play.

Figure 5:
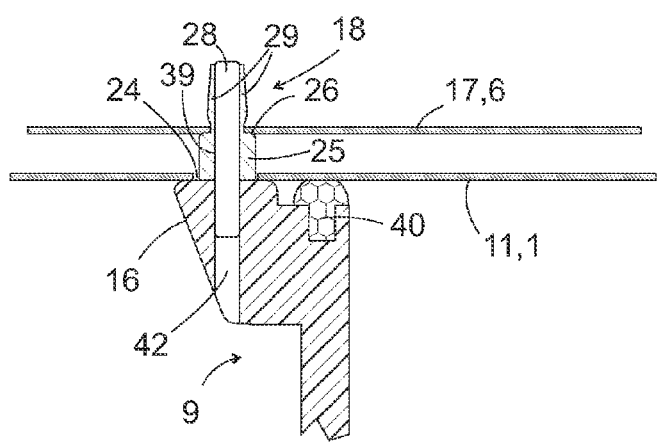
FIG. 5 is a schematic section in a vehicle longitudinal direction through the sill bulkhead and surface regions of the sill and of the fender fastened thereto and located opposite each other.

In the position now reached, the opening 24 in the upper leg 11 overlaps with the top side of the transom 16, so that the protrusion 18 can be mounted within it. This can be performed in that the fingers 29 of the protrusion 18 are initially pushed into the opening 19 of the fastening flange 17 and engaged therein, and the fastening flange 17 is subsequently anchored to the sill 1 by means of the screw 20 and through inserting of the pin 28 through a bore 39 of the protrusion 18 as far as into a bore 42 (see FIG. 5) of the transom 16. In that a foamed-out insert 40, which is attached in a groove of the sill bulkhead 9 extending alongside the rim 15, expands while the body is passing through a painting oven, a water-tight connection between the rim 15 and the sill 1 is obtained.

According to another embodiment shown in FIGS. 6 and 7, the protrusion 18 on its lower side facing the transom 16, is provided with engagement hooks 41 round about the bore 39. When, following the attachment of the sill bulkhead 9 in the sill 1 the protrusion 18 is pressed through the opening of the upper leg 11 against the transom 16, the engagement hooks 41 engage in an undercut 43 of the bore 42 of the transom, so that the protrusion 18 is seated tightly on the transom 16, provisionally fixing the sill 1. Following this, the fender 6 is positioned wherein the opening 19 of its fastening flange 17 is put over the fingers 29 of the protrusion 18 and the fastening flange 17 finally comes to rest on the top side 26 of the block 25.

The placement of the pin 28 can be carried out before or after the attachment of the screw 20. In that the pin 28 is pushed into the bores 39, 42 of the protrusion 18 and of the transom 16, both the engagement hooks 41 as well as the fingers 29 are fixed in their position, so that the protrusion 18 can merely come loose from the sill bulkhead 9 through a tearing of the engagement hooks 41 and the profile of the fingers 29, as is evident in particular in FIG. 7, also prevents a lifting-off of the fastening flange 17 from the top side 26.

The pin 28 consists of a plastic material of moderate shearing strength. Horizontal shearing forces, which can occur during an accident between the fastening flange 17 and the leg 11 of the sill 1, result in a shearing-off of the pin 28 at the height of the top of the transom 16 and to a tearing-off of the engagement hooks 41. Because of this, the sill 1 and the fender 6 become moveable relative to each other in vehicle longitudinal direction and can evade or yield to deformation forces, without mutually damaging each other. In order to mount a new sill 1 if applicable, it is then sufficient to replace the protrusion 18 and the pin 28. Thus, a quick and cost-effective repair is possible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle body comprising:
a sill extending under a door opening, the sill having a first leg spaced from a second leg by a curved intermediate section, the first leg defining a first opening and the second leg defining a second opening;
a fender fastened to the first leg of the sill;
a sill bulkhead sealing off an inner hollow space of the sill at a face end, the sill bulkhead including a baseplate that is substantially vertical and orientated in vehicle transverse direction, and a rim that surrounds the baseplate, the rim having a curvature that corresponds with the curved intermediate section of the sill so that the sill follows the rim along the curvature of the rim, the baseplate including a first end adjacent to the first leg of the sill and a second end adjacent to the second leg of the sill, the first end including a protrusion that engages the fender and the first opening of the first leg of the sill to form a first fastening point and the second end including a hook that engages the second opening of the second leg of the sill to couple the sill bulkhead to the second leg of the sill; and
a second fastening point on the sill bulkhead for fastening the fender to the sill.

2. The motor vehicle body according to claim 1, wherein a fastening flange is angled off on a tower edge of the tender.

3. The motor vehicle body according to claim 2, wherein the protrusion is joined to a flange of the sill bulkhead supporting the surface region of the sill.

4. The motor vehicle body according to claim 3, wherein the protrusion is connected to the flange via a shearable pin.

5. The motor vehicle body according to claim 1, wherein the fender is fixed on the sill in a direction that is parallel to the surface regions through the engaging of the protrusion.

6. The motor vehicle body according to claim 1, wherein the surface region of the fender rests on a step of the protrusion.

7. The motor vehicle body according to claim 6, wherein a tip of the protrusion rising above the step engages in the opening of the fender.

8. The motor vehicle body according to claim 7, wherein the tip comprises fingers that can be spread apart.

9. The motor vehicle body according to claim 1, wherein the sill has a U-shaped cross section.

10. The motor vehicle body according to claim 9, wherein the second fastening point comprises a screw connection.

11. The motor vehicle body according to claim 1, wherein the second opening of the second leg of the sill is arranged on a side of the sill bulkhead facing away from the inner hollow space.

12. The motor vehicle body according to claim 11, wherein the hook acts on an edge of the second opening extending in vehicle transverse direction.

* * * * *